May 28, 1968  G. P. R. FARR  3,385,308
HYDRAULIC BRAKE PRESSURE PROPORTIONING DEVICE
Filed Dec. 27, 1965  5 Sheets-Sheet 1

May 28, 1968

G. P. R. FARR 3,385,308

HYDRAULIC BRAKE PRESSURE PROPORTIONING DEVICE

Filed Dec. 27, 1965

United States Patent Office 3,385,308
Patented May 28, 1968

3,385,308
HYDRAULIC BRAKE PRESSURE
PROPORTIONING DEVICE
Glyn Phillip Reginald Farr, Kenilworth, England,
assignor to Girling Limited, Tyseley, Birmingham,
England
Filed Dec. 27, 1965, Ser. No. 516,267
Claims priority, application Great Britain, May 20, 1965,
21,324/65; May 22, 1965, 21,767/65
31 Claims. (Cl. 137—38)

As is well known, during rapid deceleration of a vehicle, the weight on the front wheels is increased with a corresponding decrease in weight on the rear wheels. If the braking forces applied to the front and rear wheels are equal there is thus a danger of the rear wheels locking and skidding well before the braking force applied to the front wheels has become sufficiently great for there to be a danger also of the front wheels locking. Rear wheel skidding may therefore take place before the front wheel brakes are being used to their full effect.

A prior art brake pressure proportioning device for a vehicle hydraulic braking system has a differential piston movable against a spring and a deceleration responsive valve which, when in its normal open condition, interconnects two chambers connected respectively to the brake master cylinder and the rear brake slave cylinders. During initial application of the brakes the pressure in the second chamber acting on the larger face of the piston overcomes the same pressure in the first chamber acting on the smaller face of the piston and moves the piston against the spring. When the deceleration responsive valve closes as skid conditions are approached, the two chambers are isolated from one another and further increase of pedal pressure causes the differential piston to move in the opposite direction and release the spring. Consequently a pressure differential arises between the first and second chambers and the further increase in rear brake pressure is not as great as the further increase in front brake pressure, whereby a greater overall braking force may be achieved before skid conditions are reached.

This prior art device has several disadvantages as follows: As the differential piston moves to compress the spring during normal application of the brakes, the device consumes hydraulic fluid which leads to excessive pedal travel and a "spongy" feeling of the brake pedal which can be very disconcerting to the driver, if not dangerous. Also the differential piston has two seals to atmosphere which are under friction every time the brakes are applied and therefore very subject to wear. Failure of either of these seals leads to a loss of brake fluid from the system.

A general object of the invention is to provide an improved brake pressure proportioning device for proportionally reducing the hydraulic pressure applied to the rear brakes as compared with the hydraulic pressure applied to the front brakes when a predetermined deceleration is reached.

A more specific object of the present invention is to provide a hydraulic brake pressure proportioning device which dos not cause excessive brake pedal travel during normal braking.

Another object of the invention is to provide a brake pressure proportioning device with a plunger slidable in a bore between two chambers connected respectively to a master cylinder and to at least one slave cylinder, and having opposite faces of substantially equal effective areas exposed to said chambers.

A further object of the invention is to provide a brake pressure proportioning device with a plunger displaceable against a spring in a direction to decrease the volume of the second chamber connected to the rear brakes with a substantially equal increase in the volume of the first chamber connected to the master cylinder, when and only when the deceleration responsive valve of the device is closed.

A still further object of the invention is to provide a brake pressure proportioning device with a plunger which requires no seal to atmospheric pressure.

Yet another object of the invention is to provide a brake pressure proportioning device with a plunger which does not move during normal operation of the brakes so that wear of the seal is minimised.

The known brake pressure proportioning device with a differential piston has a further disadvantage in that each design of brake system employing such a device requires an individual size of differential piston and in many cases an individual size of spring.

A further object of the invention is to provide a brake pressure proportoning device with a standard size plunger suitable for a wide range of brake systems.

It is known to provide a brake pressure proportioning device with a deceleration responsive valve whose inertia member is arranged to move to close the valve seat in response to a flow surge through the deceleration responsive valve as well as in response to a predetermined deceleration. In power-assisted braking systems of heavy vehicles a considerably greater flow of brake fluid from the master hydraulic cylinder (actuated by a booster) to the slave cylinders occurs during normal braking than in non-assisted braking systems (wherein the master cylinder is actuated directly by a pedal). If the whole of the flow to the rear brakes were to pass through the deceleration and flow responsive valve, this valve would have to be very large in order that it shall not be over-sensitive.

Therefore another object of the invention is to provide a small and compact brake pressure proportioning device suitable for heavy lorries with power assisted hydraulic brakes.

Yet another object of the invention is to provide a brake pressure proportioning device in which part of the normal flow of fluid to the rear brakes is by-passed around the flow responsive valve.

A still further object is to provide such a device with a by-pass valve for by-passing the flow responsive valve and controlled in accordance with the pressure drop appearing across a throttle in series with the flow responsive valve.

The invention will be further described, by way of example, with reference to the accompanying drawings in which.

Figure 1:
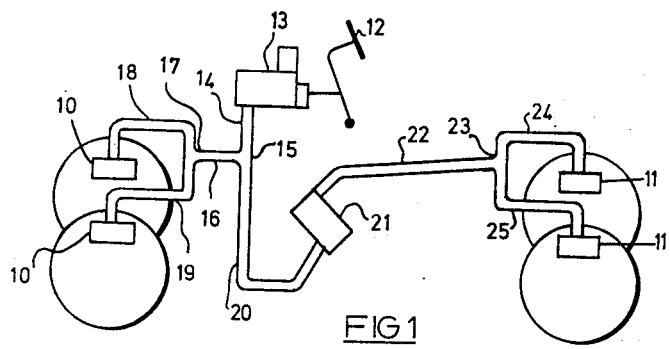
FIG. 1 is a diagram of a hydraulic braking system for a vehicle.

Referring to the drawings, FIG. 1 shows a pair of front brakes 10 (e.g. disc brakes) and a pair of rear brakes 11 (e.g. drum brakes) of a vehicle braking system which also includes a foot-pedal 12 for actuating a master cylinder 13. A brake line 14 leads from the master cylinder 13 to a T-connection 15 from which a front brake line 16 leads to another T-connection 17. Branch lines 18 and 19 extend from the T-connection 17 to the slave cylinders of the front brakes 10. A hydraulic line 20 from the T-connection 15 leads to a brake pressure proportioning device 21 of which several embodiments will be described hereinafter. A rear brake line 22 leads from the device 21 through a T-connection 23 and branch lines 24 and 25 to the slave cylinders of the rear brakes 11.

The purpose of the brake pressure proportioning device 21 is to proportionally reduce the pressure in the rear brake line 22 as compared with the pressure in the line 20 (which is equal to the pressure in the front brake line 16) when a predetermined deceleration is reached, whereby a greater overall braking force may be achieved before skid conditions are reached.

Figure 2:
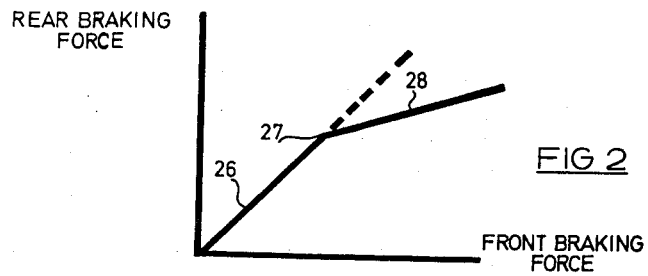
FIG. 2 is a graph in which the rear braking force is plotted against the front braking force in the braking system.

The graph in FIG. 2 shows that, when the deceleration is insufficient to cause response of the device 21, the rear braking force is equal to or in a fixed proportion to the front braking force (the straight line 26). However when the combined front and rear braking forces reach a point (27 in the graph) at which the deceleration is sufficient to cause response by the device 21, further increased actuation of the brake pedal 12 does not cause the rear braking force to further increase as rapidly as the front braking force as shown by the line 28 which has a smaller slope than the line 26.

If the brakes are applied very strongly and very suddenly there is a risk of skid conditions being reached at the rear wheels before the device 21 has responded to the sudden deceleration. The device 21 is therefore also made responsive to a surge of brake fluid through the device 21 to the rear brakes 11, such as is obtained upon sudden strong actuation of the brake pedal 12. In this way the rear braking force is reduced as compared with the front braking force in the manner indicated in the graph in FIG. 2 also upon sudden heavy application of the brakes.

Although FIG. 1 shows separate T-connections in the brake lines, one or more of the T-connections 15, 17 and 23 can be incorporated in the device 21. Also the device 21 may be employed in conjunction with a tandem master cylinder. In this case the front and rear brake lines 16 and 20 are connected to separate chambers in the tandem master cylinder and the T-connection 15 is eliminated.

Figure 3:
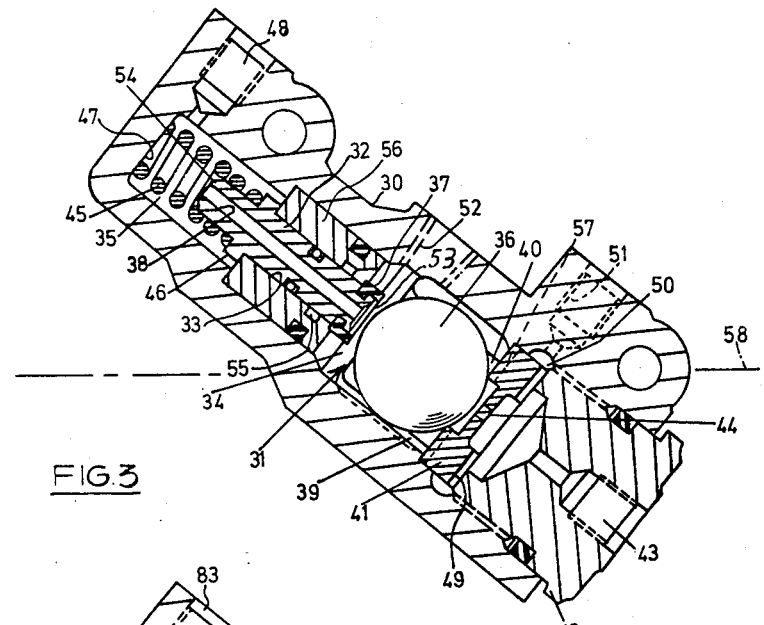
FIGS. 3, 4 and 5 are longitudinal sections respectively of first, second and third embodiments of brake pressure proportioning devices constructed in accordance with the present invention for a braking system of the type shown in FIG. 1.

FIG. 3 shows the first embodiment of brake pressure proportioning device. It comprises a body 30 containing a deceleration responsive valve 31 and a plunger 32. The plunger 32 is slidable in a bore 33 in a bush 56 which is a force fit in the body 30 and sealed thereto by a suitable sealing ring. An O-ring seals the plunger 32 to the bore 33 which extends from a first chamber 34 to a second chamber 35 in the body 30.

The deceleration responsive valve 31 comprises a ball 36 co-operable with a valve seat 37 formed on one end of the plunger 32 which has a through bore 38 leading from the valve seat 37 to the second chamber 35. The ball 36 has appreciable inertia and is arranged to roll in the valve chamber (the chamber 34) on an incline upwardly towards the valve seat when the device is subjected to a predetermined deceleration. The incline is formed by a sloping rail 39 in the vertical plane through the centre of the ball 36. The horizontal plane is indicated by the line 58. Two guide rails 40, of which only one is shown, are provided at opposite sides of the ball 36 for guiding the ball. The rails 39 and 40 are arranged at 120° to one another with respect to the ball. The valve chamber 34 is bounded by an orifice plate 41 retained in position by a plug 42 which is provided with a socket 43 for the line 20 from the master cylinder. The orifice plate 41 contains an orifice 44 disposed to direct a jet of brake fluid onto the ball 36 to urge it towards the valve seat 37 upon a flow surge from the master cylinder to the socket 43 and through the orifice 44. The single orifice 44 could be replaced by a number of smaller orifices suitably positioned.

The ball 36 is therefore both responsive to a predetermined deceleration and sensitive to a flow surge from the master cylinder so as to close the valve seat 37.

A compression spring 45 acts between a flange 46 on the plunger 32 and the end wall 47 of the second chamber 35 and acts on the plunger 32 in a direction towards the first chamber 34. The flange 46 serves also to engage the bush 56 whereby to accurately determine the resting position of the plunger 32 illustrated and thereby the distance the ball 36 has to travel from its resting position against the orifice plate 41 to the valve seat 37. The orifice plate 41 has radial grooves 57 to permit the brake fluid to flow around the ball 36 when the ball is resting against the orifice plate as illustrated. The free length of the spring 45 is equal to the spacing between the flange 46 and the chamber end wall 47 when the plunger 32 is in its resting position so that the spring 45 is initially unstressed and the plunger 32 has no free play.

The body 30 contains a socket 48 for the rear brake line 22 and leading from the second chamber 35. The orifice plate 41 has radial grooves 49 connecting the socket 43 to an annular recess 50 in the body 30. The body 30 has a pair of sockets 51 (only one of which is shown) for the separate connection of the front brake branch lines 18 and 19 leading from the annular recess 50. The T-connections 15 and 17 of FIG. 1 are therefore incorporated in the device of FIG. 3. The first chamber 34 is provided with a socket 52 to receive a pressure sensitive switch for the usual vehicle brake lights.

When the brakes are applied in a braking system employing the device of FIG. 3, the brake pressures applied to the front and rear brakes are normally equal. The brake fluid reaches the front brakes through the socket 43, the grooves 49, the annular recess 50 and the sockets 51. The brake fluid reaches the rear brakes from the socket 43 through th orifice 44, through the grooves 57 and around the ball 36 in the first chamber 34, through the valve seat 37, the bore 38, the second chamber 35 and the socket 48. However when the device is subjected to a certain deceleration determined by the slope of the rail 39, the ball 36 rolls up the incline formed by the rail 39 and closes the valve seat 37. Full brake pressure can continue to be applied to the front brakes through the sockets 51 but can no longer be applied through the bore 38 to the rear brakes. However the plunger 32 has opposite end faces 53 and 54 of equal effective area exposed to the first and second chambers 34 and 35 respectively and the spring 45 is initially uncompressed. The pressures in the chambers 34 and 35 therefore remain equal immediately after the valve seat 37 has been closed. A continued increase in brake pressure applied from the master cylinder through the socket 43 causes a similar increase in pressure in the first chamber 34 and the plunger 32 is displaced from its normal position illustrated towards the second chamber 35, at the same time compressing the spring 45. As the effective areas of the end faces 53 and 54 of the plunger 32 are equal the increase in volume of the first chamber 34 due to such displacement is equal to the decreases in volume of the second chamber 35. However the further increase in pressure in the second chamber 35 is not as great as the further increase in pressure in the first chamber 34 because the pressure applied to the end face 53 of the plunger 32 has to counterbalance the force produced by the now-compressed spring 45 as well as the pressure applied to the end face 54. The line 28 shown in FIG.

2 is thereby obtained by the device shown in FIG. 3. The device operates in the manner just described upon a flow surge through the orifice 44 cause by sudden actuation of the brake pedal for such a surge impinges upon the ball 36 and causes it to roll up the incline and close the valve seat 37 even though the deceleration may not be sufficient of itself to cause the ball to roll up the incline.

If the device of FIG. 3 is to be used in a brake system employing a tandem master cylinder, the front brakes are connected to one chamber of the master cylinder instead of to the sockets 51, and the socket 43 is connected to the other chamber of the tandem master cylinder. In this case the sockets 51 are closed off or omitted altogether.

A disadvantage of the device shown in FIG. 3 is that it is difficult to expel all the air from the vicinity of the valve seat 37 during bleeding of the system due to the cavity 55 which has to be provided in the bush 56 to accommodate the valve seat. The embodiment of FIG. 4 substantially avoids this disadvantage by providing a plunger whose diameter is not less than half the diameter of the ball 36 and more particularly by providing a plunger 60 of approximately the same outer diameter as the ball 36 and eliminating the bush 56. The bush 56 is in any event provided in the embodiment of FIG. 3 for the convenience of manufacture and the bore 33 could be provided in the body 30 itself if suitable alternative provision is made for the insertion of the plunger 32 during manufacture.

Figure 4:
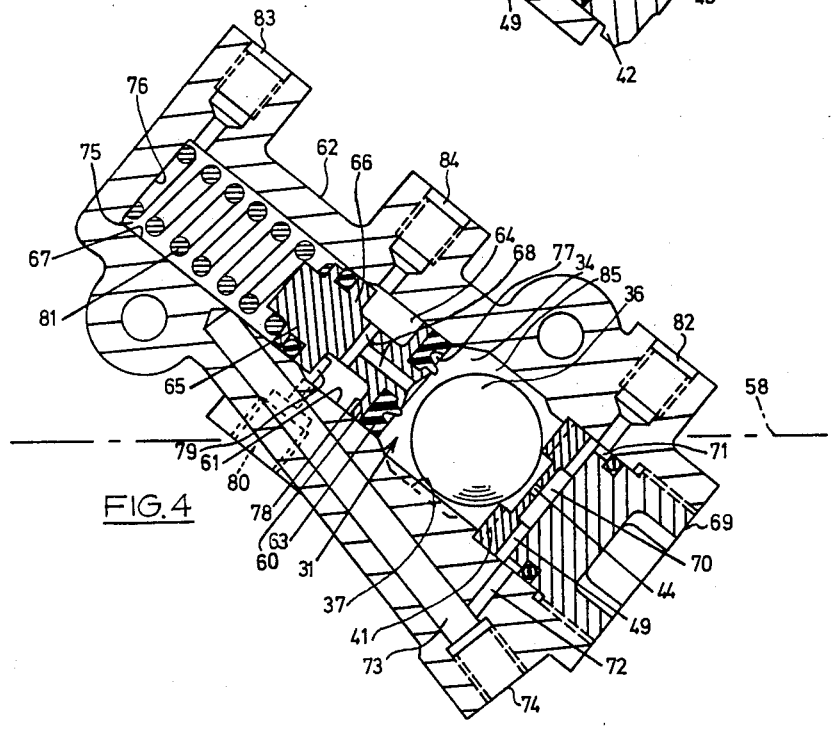

The plunger 60 of FIG. 4 is slidable in a bore 61 in the body 62 of the device and is sealed thereto by a combined valve seat and sealing ring 63. The ball 36 cooperates with the valve seat 63 to form the deceleration and flow responsive valve 31. The ball can roll up a sloping rail 39 and is guided at opposite sides by a pair of guide rails (not shown) similar to the guide rails 40 of FIG. 3. The horizontal plane is indicated by the line 58.

The plunger 60 separates a first chamber 34 from a second chamber 64. The plunger 60 is integrally connected to a piston 65 by a neck 66. The piston 65 is of smaller diameter than the plunger 60 and is sealed to a bore 67 in the body 62 by a suitable sealing ring. Longitudinal and transverse passages 68 in the plunger 60 and its neck 66 connect the valve seat 63 to the second chamber 64, which lies between the plunger 60 and the piston 65.

An orifice plate 41 is retained by a plug 69 screwed into the body 62. Radial grooves 49 connect a space 70 between the orifice plate and the plug 69 to an annular groove 71 in the plug 69 and this in turn communicates by transverse bore 72 with an oblique bore 73 in the body 62. The bore 73 leads from a socket 74, provided for attachment of the line 29 from the master cylinder, and breaks into the bore 67 so as to connect a space 75 between an end wall 76 and the piston 65 to the chamber 85 of the valve 31 through the bore 72, the grooves 71 and 49, the space 70 and the orifice 44. The face of the piston 65 remote from the plunger 60 and exposed to the space 75 is thereby always subjected to substantially the same pressure as the face 77 of the plunger 60 exposed to the first chamber 34. The valve chamber 85 forms part of the first chamber 34 which also includes the space 75 together with the interconnecting passage means 72, 71, 49, 70, 44 mentioned above. Also the face of the piston 65 facing the plunger 60 is exposed to the second chamber 64 as is the other face 78 of the plunger 60. The effective areas of the plunger faces 77 and 78 are therefore equal to one another and are equal to the difference between the actual cross sectional areas of the plunger 60 and the piston 65. A plunger 60 is thereby provided which is of substantially smaller effective area than the cross sectional area of the bore 61 in which it slides.

The normal resting position of the plunger 60 is determined by a peg 79 which is inserted through a socket 80 provided for the pressure sensitive switch for the brake lights and communicating with the second chamber 64. The peg 79 is disposed to be engaged by the rear face of the piston 65. A compression spring 81, corresponding to the spring 45 of FIG. 3, is arranged in the space 75 and its free length is equal to the spacing between the end wall 76 of the bore 67 and the front face of the piston 65 when the plunger 60 is in its resting position illustrated.

A socket 82 for one of the front brakes communicates with the annular groove 71 and another socket 83 for the other front brake communicates with the space 75. A socket 84 for the rear brakes communicates with the second chamber 64.

As explained above, the plunger 60 has equal effective areas exposed to the first and second chambers 34 and 64 respectively. Therefore movement of the plunger 60 in a direction to compress the spring 81 is consequent upon an increase in the volume of the first chamber 34 equal to the decrease in volume of the second chamber 64.

It will be appreciated that the device of FIG. 4 operates exactly in the same manner as the device of FIG. 3.

A disadvantage of the devices of FIGS. 3 and 4 is that, if the spring 45 or 81 is made slightly too short, there will be slight travel of the plunger 32 or 60 after the ball 36 has closed the valve seat 37 or 63 but before commencement of compression of the spring 45 or 81. Consequently further actuation of the brake pedal will be necessary after the valve 31 has closed responsively to deceleration or to a flow surge before the device commences to proportion the pressure between the front and rear brakes and skid conditions could be reached before the device operates. On the other hand, if the spring 45 or 81 should be made slightly too long it will be slightly precompressed when the plunger 32 or 60 is in its resting position. The consequence of this is that, after the valve 31 has closed, a further increase in pressure from the master cylinder is required before the plunger 32 or 60 can commence to move against the spring 45 or 81. This results in a dwell in the rear brake pressure as the front brake pressure is being further increased. This disadvantage is avoided in the device of FIGS. 5 and 6 wherein an auxiliary spring 100 determines the normal resting position of the plunger 101.

Figure 5:
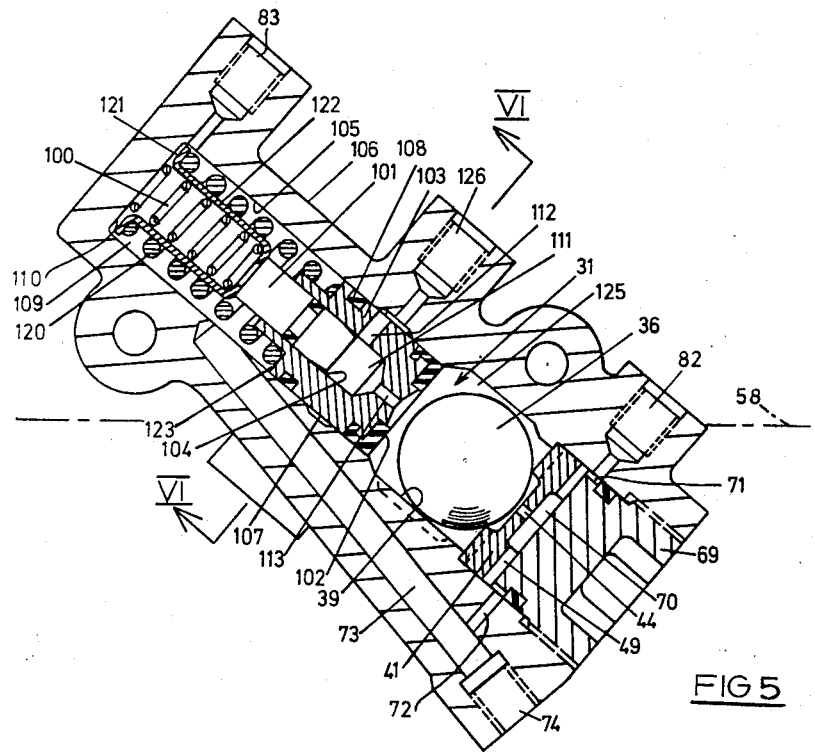
Figure 6:
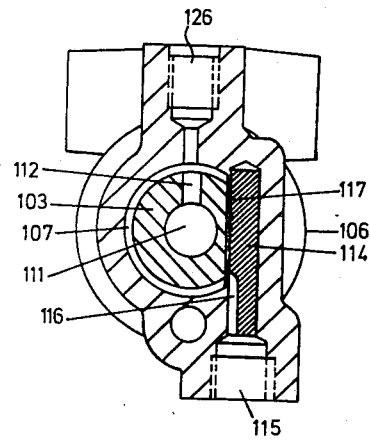
FIG. 6 is a section on the line VI—VI of FIG. 5.

The brake pressure proportioning device of FIGS. 5 and 6 comprises a deceleration and flow responsive valve 31 which comprises a ball 36 cooperable with a fixed valve seat 102. The ball can roll up a sloping rail 39 and is guided at opposite sides by a pair of guide rails (not shown) similar to the guide rails 40 of FIG. 3. The horizontal plane is indicated by the line 58. For manufacturing convenience the valve seat 102 is attached to a bush 103 which also contains a bore 104 in which the plunger 101 is slidable. The bush 103 is fitted in a larger bore 105 formed in the body 106 of the device. An annular groove 107 is provided in the bore 105 around the periphery of the bush 103. The valve seat 102 serves also as a seal sealing the bush 103 to the bore 105 at one side of the annular groove 107 and a sealing ring 108 seals the bush to this bore at the other side of the annular groove. A first chamber 109 is defined in the bore 105 between the end wall 110 of this bore and the bush 103. A second chamber 111 is defined by the inner end of the bore 104 within the bush 103. A radial passage 112 in the bush 103 connects the second chamber 111 to the annular groove 107 and an axial bore 113 connects the valve seat 102 to this chamber. A peg 114 (see FIG. 6) is fitted in a socket 115 adapted to receive a pressure sensitive switch for the brake lights. A groove 116 in the peg 114 allows the pressure sensitive switch to communicate with the annular groove 107. The peg 114 engages a flat 117 on the periphery of the bush 103 and serves to accurately locate this bush axially.

A compression spring 120 is arranged in the first chamber 109 and acts on the plunger 101. The spring 120 is fitted between an out-turned flange 121 at the end of a sleeve 122 which is permanently attached to the end of the plunger 101 and an abutment surface 123 on the bush 103 fixed in the body 106. The free length of the spring 120 is slightly less than the free space available between the spring abutment surface 123 on the bush 103 and the out-turned flange 121 if this flange is moved into abutment with the chamber end wall 110. To bias the plunger 101 to its normal resting position, illustrated, in which the out-turned flange 121 is slightly spaced from the end wall 110 the light spring 100 is provided between this end wall and the end of the plunger.

An orifice plate 41 having an orifice 44 is secured in the body 106 by a plug 69. Radial grooves 49 in the orifice plate 41 connect a space 70 communicating with the orifice 44 to an annular groove 71 in the plug 69. A transverse bore 72 connects this annular groove 71 to an oblique bore 73 in the body 106. This bore extends from a socket 74 for the line 20 from the master cylinder to the first chamber 109. The socket 74 communicates with the chamber 125 of the valve 31 through the transverse bore 72 the annular groove 71, the radial grooves 49, the space 70 and the orifice 44.

The plunger 101 is sealed to the bore 104 by a suitable O-ring and it will be seen that the effective areas of the plunger 101 exposed to the first and second chambers 109 and 111 respectively are equal to one another. During normal braking conditions the valve 31 is open and the plunger 101 is pressure-balanced. The spring 100 can therefore maintain the plunger 101 in its normal resting position illustrated in which the out-turned flange 121 abuts the spring 120 and the spring 120 abuts the abutment surface 123 on the bush 103 so that the plunger 101 has no free play but the spring 120 is uncompressed.

Sockets 82 and 83 for the front brake branch lines 18 and 19 communicate respectively with the annular groove 71 and the first chamber 109. A socket 126 for the rear brake line 22 communicates with the annular groove 107 and thereby with the second chamber 111 through the passage 112.

Immediately the ball 36 of the valve 31 closes the valve seat 102 in response to a predetermined deceleration or a flow surge through the orifice 44, the chambers 109 and 111 are isolated from one another and a further increase in the applied braking pressure in the chamber 109 causes the plunger 101 to move towards the second chamber 111, compressing the spring 120 and the device operates as described above in connection with the previous embodiments.

Variations in the free length of the spring 120 substantially do not affect the operation of the device, provided that the spring is not so long that the out-turned flange 121 is pressed against the end wall 110, since the spring 120 is always initially unstressed and there is no free movement of the plunger 101 from its normal resting position before compression of the spring 120 takes place.

The travel of the ball 36 from its normal resting position against the orifice plate 41 to the valve seat 37, 63 or 102 in the above described embodiments has been found to be fairly critical if the performance of the device is to be accurately predictable. A disadvantage of the embodiment of FIGS. 3 to 6 is that a large number of surfaces have to be accurately formed to close manufacturing tolerances in order to accurately predetermine the ball travel. The embodiments of FIG. 7 reduces the number of surfaces which have to be machined to close tolerances by providing a combined orifice plate and cage 130 for the ball 36 of the deceleration responsive valve 31.

Figure 7:
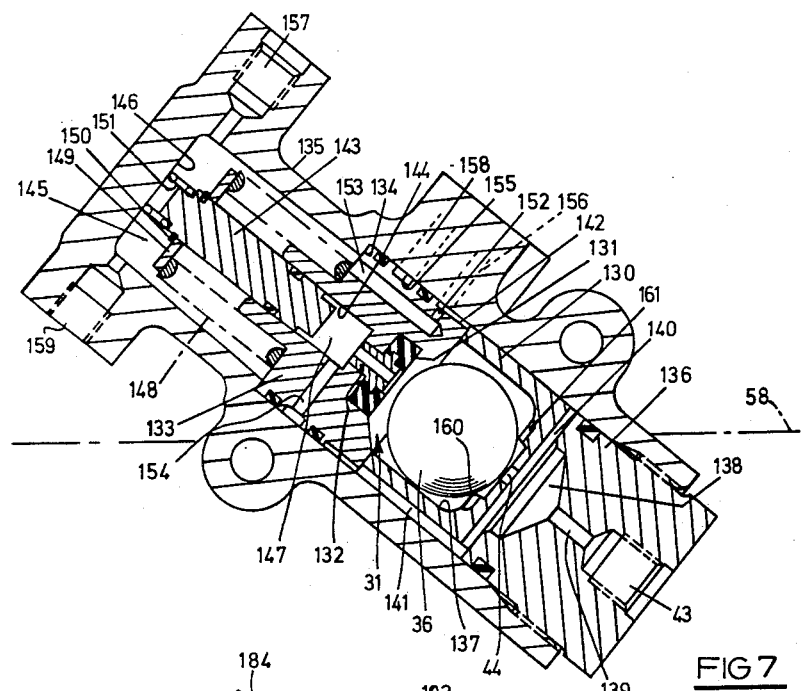
FIGS. 7 and 8 are longitudinal sections of fourth and fifth embodiments of brake pressure proportioning devices constructed in accordance with the invention.

The deceleration and flow responsive valve 31 of the embodiment of FIG. 7 has a valve seat 131 which is secured by a tubular piece 132 to a bush 133 corresponding to the bush 103 of FIG. 5. The bush 133 is held in abutment with a shoulder 134 in the body 135 of the device by the cage 130 which is in turn held in place by a plug 136 screwed into the end of the body 135. Three rails arranged at 120° to one another for guiding the ball 36 are formed within the cage 130. Of these rails only the rail 137 forming the incline on which the ball rolls is shown. A cavity 138 is formed at the inside of the plug 136 so as to communicate with an orifice 44 in the combined orifice plate and cage 130. As with the other embodiments of the invention, the single orifice 44 could be replaced by a number of smaller orifices suitably positioned to direct jets of brake fluid onto the ball. The plug 136 has a socket 43 for the brake line 20 from the master cylinder and this socket communicates with the cavity 138 through an axial bore 139. The combined orifice plate and cage 130 has a transverse groove 140 across its face abutting the plug 136, this groove communicating with the cavity 138. A groove 141 extends the length of the combined orifice plate and cage 130 from the transverse groove 140 and communicates with an annular recess 142 formed about the periphery of the bush 133.

A plunger 143 corresponding to the plunger 101 of FIG. 5 is slidable in a bore 144 in the bush 133 and is sealed to this bore by an O-ring. A first chamber 145 is defined within the body 135, between an end wall 146 and the bush 133, and a second chamber 147 is defined by the inner end of the bore 144 in the bush 133. The valve seat 131 communicates with the second chamber 147 through the tubular piece 132. The plunger 143 has equal effective areas exposed to the first and second chambers 145 and 147 respectively, which chambers correspond to the chambers 109 and 111 of FIG. 5. A compression spring 148 corresponding to the spring 120 of FIG. 5 is arranged between a washer 149, secured by a spring ring 150 to the plunger 143, and the bush 133. A comparatively light spring 151 acts between the end of the plunger 143 and the end wall 146 and acts correspondingly to the spring 100 of FIG. 5 to normally maintain the plunger 143 without free play in its resting position illustrated in which the plunger 143 is spaced from the end wall 146 and the spring 148 is uncompressed.

The annular groove 142 in the bush 133 is connected by a transverse bore 152 and a longitudinal bore 153 to the first chamber 145. The second chamber 147 is connected by a radial bore 154 to an annular groove 155 in the periphery of the bush 133. Sealing rings seal the annular groove 155 from the first chamber 145 and from the annular recess 142.

Sockets 156 and 157 for the front brake branch lines 18 and 19 communicate respectively with the annular recess 142 and the first chamber 145. A socket 158 for the rear brake line 22 communicates with the annular groove 155 in the bush 133. A socket 159 for the pressure responsive switch for the brake lights communicates with the first chamber 145.

The embodiment of FIG. 7 operates in exactly the same manner as the embodiment of FIGS. 5 and 6. Fluid flows to the front brakes from the socket 43 through the bore 139, the cavity 138, the transverse groove 140, the longitudinal groove 141 and the annular recess 142 to the socket 156 and from the annular recess 142 through the bores 152 and 153 and the first chamber 145 to the socket 157. Fluid flows from the second chamber 147 to the rear brakes through the radial bore 154, the annular groove 155 and the socket 158.

It will be seen that the travel of the ball 36 from its resting position against an annular abutment 160 in the combined orifice plate and cage 130 to the valve seat 131 is determined only by the axial distance between the valve seat and the surface of the bush 133 abutted by the combined orifice plate and cage 130 and by the axial distance between the surface of the combined orifice plate and cage 130 abutting the bush 133 and the annular abutment 160 in the combined orifice plate and cage. Notches 161 are provided in the annular abutment 160 so that the fluid can flow around the ball 36 when it is in its resting position against this abutment. Thus there are no radially extending surfaces which have to be machined to a close tolerance in the body 135 itself. The shoulder 134 and the end wall 146 do not have to be machined to close tolerances because of the provision of the light spring 151 and the screw plug 136.

Figure 8:
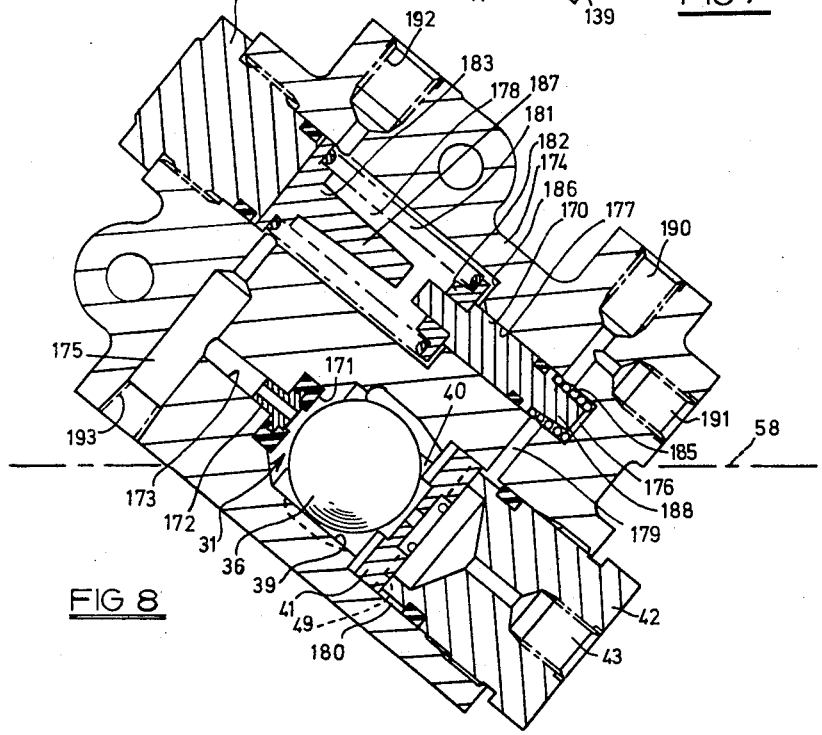

The embodiment of FIG. 8 operates in exactly the same manner as the embodiments of FIGS. 5 to 7 but their components are somewhat differently arranged. In particular the plunger 170 is provided to one side of the deceleration and flow responsive valve 31. The valve 31 comprises a ball 36 rolling on a rail 39 and guided by two further rails 40 arranged as described with reference to FIG. 3. An orifice plate 41 is retained in position by a plug 42 which is provided with a socket 43 for the rear brake line 20 from the master cylinder. The plunger 170 is slidable in a blind bore 177 in the body 174 parallel to the longitudinal axis of the valve 31 and is sealed to this bore by an O-ring. One end of the plunger 170 is exposed to a first chamber 176 defined at the inner end of the bore 177. A transverse passage 179 in the body 174 connects an annular groove 180 in the inner end of the plug 42 to the first chamber 176 and radial grooves 49 in the face of the orifice plate 41 connect the socket 43 to the annular groove 180. The seat 171 of the valve 31 is retained by a tubular piece 172 wedged in a bore 173 in the body 174 of the device. The bore 173 leads to a transverse passage 175 connected to a second chamber 178 to which the other end of the plunger 170 is exposed.

A compression spring 181 arranged in the second chamber 178 acts between a washer 182 on said other end of the plunger 170 and a backing member 183 retained in the body 174 by a plug 184. A comparatively light spring 185 in the first chamber 176 acts on the plunger 170 to normally hold it without free play in its resting position illustrated in which the washer 182 is spaced from the end wall 186 of the chamber 178 and the spring 181 is uncompressed. The springs 181 and 185 correspond to the springs 120 and 100 of FIG. 5. The backing member 183 has a projection 187 which prevents the spring 181 being over-compressed, e.g. during assembly. Likewise the plunger 170 has a projection 188 which prevents the spring 185 from being over-compressed.

Sockets 190 and 191 for the front brake branch lines 18 and 19 communicate with the first chamber 176 and a socket 192 for the rear brake line communicates with the second chamber 178. A socket 193 for the pressure sensitive switch for the brake lights communicates with the transverse passage 175.

In a brake pressure proportioning device in accordance with the present invention, there is provided a plunger which has equal effective areas exposed to first and second chambers as described above by way of example with reference to FIGS. 3 to 8 of the drawings and has a valve arranged in a passage between the first and second chambers and adapted to close responsively to a predetermined deceleration. When this valve closes, increasing pressure applied to the first chamber by the brake pedal causes the plunger to displace from its normal resting position towards the second chamber against a spring which is initially substantially unstressed. The increase in volume of the first chamber due to such movement is equal to the decrease in volume of the second chamber but the pressure in the second chamber does not further increase as rapidly as the pressure in the first chamber because the latter has also to counteract the compression of the spring. This arrangement has several advantages over a previously proposed brake pressure proportioning device which has a differential piston exposed to first, second and third chambers connected respectively to the master cylinder, the rear brake slave cylinders and atmospheres (or other reference pressure). With the previously proposed valve the differential piston is displaced towards the first chamber against a spring with a decrease in volume of the first chamber substantially less than the corresponding increase in volume of the second chamber before the deceleration responsive valve closes. This means that the proportioning device consumes brake fluid as well as the brakes during normal application of the brakes and results in that a large travel of the brake pedal is required for normal application of the brakes and this "spongy" feeling of the brake pedal can be very disconcerting to the driver. Also, due to the three chambers, two seals to atmosphere are required past which leakage of brake fluid could occur if the seals fail. Furthermore each differential piston and therefore the corresponding bores in which it slides have to be dimensioned to be suitable for each individual design of vehicle. As a consequence individual body castings can only be used over a limited range of brake systems. With the brake pressure proportioning device of the invention there is no spongy feeling of the pedal during normal operation of the brakes because the plunger does not move and there is no consumption of brake fluid by the device even when the deceleration responsive valve is closed because any increase in volume of the first chamber is matched by the corresponding decrease in volume of the second chamber. Furthermore, as there are no seals to atmosphere associated with the plunger, failure of the plunger seal cannot result in any leakage of brake fluid from the braking system but only a possible loss of compression of the spring 45, 81, 120, 148 or 181 which would impair the operation of the device but would have no serious effect on the braking system as a whole. A further advantage of the device of the invention is that, as the plunger only moves during the infrequent occasions when the device operates, the plunger seal is not subjected to heavy wear. The same design of body casting can be used for a wide range of brake pressure proportioning devices suitable for many different braking systems because the characteristics of the device can be varied widely merely by changing the spring against which the plunger is displaced when the deceleration responsive valve is closed. There is not even any need to provide a series of plungers of different dimensions for a range of the devices because the characteristic of this spring can be fully matched against the effective area of the plunger and the manner in which the brake pressure is to be proportioned between the front and rear brakes.

The brake pressure proportioning devices illustrated in FIGS. 3 to 9 of the drawings can be so mounted on the vehicle that their angle of inclination to the horizontal 58 can be adjusted either manually or automatically in accordance with the load on the vehicle. Such adjustment varies the value of the deceleration at which the device commences to operate and is desirable particularly for heavy commercial vehicles wherein the rear wheels are very lightly loaded and therefore much more prone to skidding when the vehicle is unladen.

FIGS. 9 to 12 of the drawings illustrate two further embodiments of brake pressure proportioning devices which have the above described advantages and characteristics but which are suitable for very heavy vehicles having power assisted brakes and therefore a very large flow of hydraulic brake fluid to the brakes during normal braking. If the devices of FIGS. 3 to 8 were used with such vehicles, the deceleration and flow responsive valve 31 would be much too sensitive and would close even during slight application of the brakes unless this valve were made very large. In the embodiments of FIGS. 9 to 12 a by-pass valve is provided in parallel with the deceleration and flow responsive valve so that not all of the brake fluid flowing to the brakes need pass the latter valve. When the deceleration and flow responsive valve closes, the by-pass valve also closes.

Figure 9:
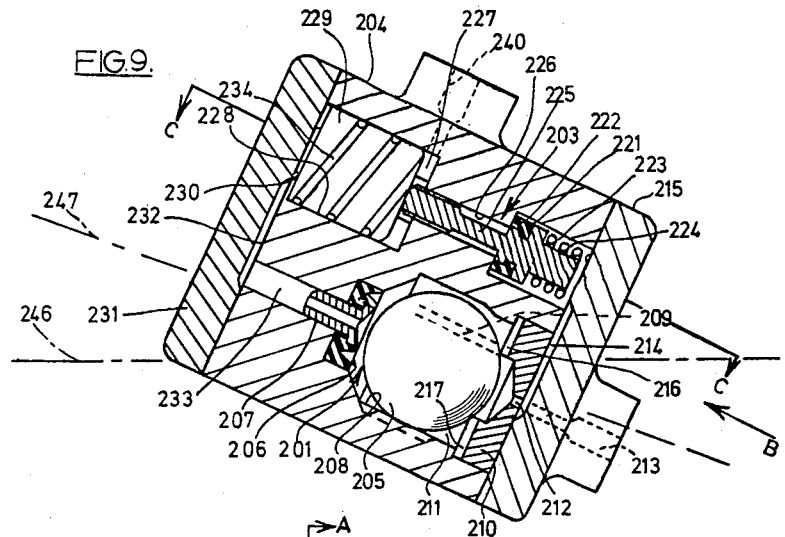
FIG. 9 is a section on the line A—A of FIG. 10 of a brake pressure proportioning device constructed in accordance with a sixth embodiment of the invention.
Figure 10:
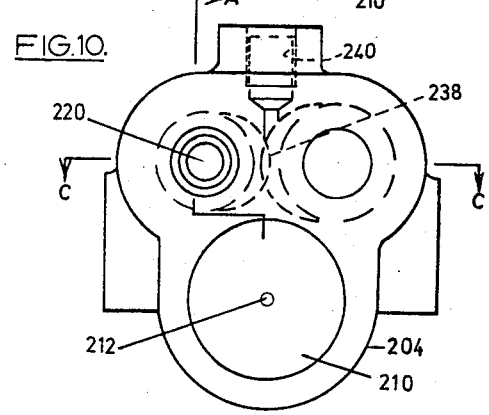
FIG. 10 is an end elevation of the device of FIG. 9 viewed in the direction of the arrow B with an end plate removed.
Figure 11:
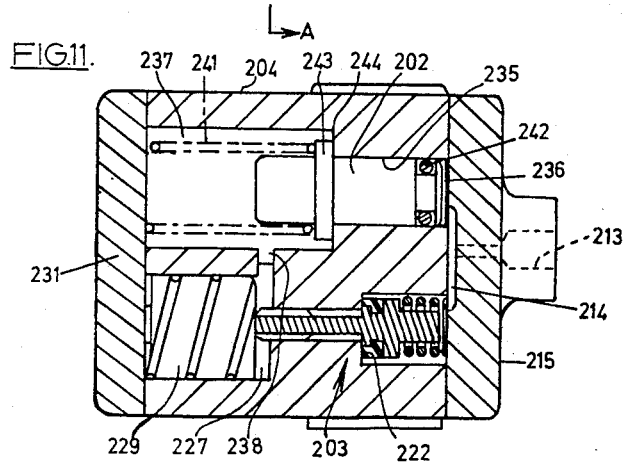
FIG. 11 is a section on the line C—C of FIGS. 9 and 10.

The brake pressure proportioning device of FIGS. 9, 10 and 11 comprises a flow and deceleration responsive valve 201, a plunger 202 and a by-pass valve 203 arranged in a body 204 with their longitudinal axes parallel to one another. The flow and deceleration responsive valve 201 comprises a ball 205 movable in the chamber 211 of the valve 201 along an incline towards and away from a valve seat 206 secured in the body by a tubular piece 207 which is a force fit in a bore 233. The incline is formed by a sloping rail 208 vertically below the centre of the ball 205.

Two guide rails 209 (one of which is shown in dotted lines) are arranged at opposite sides of the ball 205 parallel to the rail 208. The rails 208 and 209 are arranged at 120° to one another with respect to the ball 205.

An orifice plate 210 retains the ball 205 in the valve chamber 211 and is provided with a central orifice 212 disposed to direct a jet of brake fluid onto the ball 205 to urge it towards the valve seat 206 upon a flow surge from the master cylinder to a socket 213. The single orifice 212 could be replaced by a number of smaller orifices suitably positioned. The socket 213 is connected to a cavity 214 formed in an end plate 215 secured by bolts (not shown) to the body 204 and holding the orifice plate 210 in position. The cavity 214 overlaps the orifice 212. The ball 205 normally rests against an annular abutment 216 on the orifice plate 210 which is provided with radial grooves 217 permitting brake fluid to flow around the ball 205 when in its resting position illustrated.

The by-pass valve 203 comprises a movable valve closure member 220 having a seal 221 adapted to close a valve seat 222 in the body 204. The closure member 220 is contained in a valve chamber 223 which is partially overlapped by the cavity 214 in the end plate 215. A closure spring 224 acts between the end plate 215 and the closure member 220 to bias the valve 203 to its closed position illustrated. A stem 225 of the closure member 220 extends through the valve seat 222 and through a passage 226 connected thereto to a space 227 formed by the inner end of a bore 228 in the body 204. A piston 229 is slidable in the bore 228 and engages the free end of the valve stem 225. A space 230 is formed in the bore 228 between the piston 229 and an end plate 231 bolted to the body 204. The end plate 231 has a cavity 232 formed therein connecting the space 230 to the bore 233 in which the tubular piece 207 is inserted. A helical groove 234 formed about the periphery of the piston 229 constitutes a throttle interconnecting the spaces 230 and 227.

The plunger 202 is slidable in a bore 235 between a first chamber 236 and a second chamber 237. The first chamber 236 is formed at the end of the bore 235 closed by the end plate 215 and is overlapped by the cavity 214 therein and thereby connected to the socket 213. The second chamber 237 is connected by a passage 238 to the space 227 which is connected by the passage 226 to the valve seat 222 of the by-pass valve 203 and by the throttling groove 234 to the valve seat 206 of the flow and deceleration responsive valve 201. A socket 240 for the rear brake line 22 is connected to the passage 238.

The plunger 202 is sealed to the bore 235 by an O-ring 242 and has equal effective areas exposed to the first and second chambers 236 and 237. A compression spring 241 acting on the plunger 202 is fitted between a flange 243 on the plunger 202 and end plate 231. The free length of the spring 241 is equal to the spacing between the end plate 231 and the flange 243 when the plunger 202 is in its normal resting position illustrated with the flange 243 in abutment with a shoulder 244 at the inner end of the second chamber 237. Thus the plunger 202 has no free play when in its normal resting position and the spring 241 is unstressed.

Upon normal application of the brakes, the fluid for applying the rear brakes flows through the socket 213, the orifice 212, the grooves 217, the valve chamber 211, the valve seat 206, the tubular piece 207, and bore 233, the cavity 232, the space 230, the helical throttling groove 234, the space 227, the passage 238 and the socket 240. If the brakes are applied very slowly the by-pass valve 203 remains closed. However if the brakes are applied more rapidly there is a greater flow of fluid through the throttling groove 234 which causes a pressure difference between the spaces 230 and 227 acting on the piston 229 to produce a force sufficient to overcome the closure spring 224 thereby opening the by-pass valve 203. Some of the fluid flowing to the rear brakes now flows from the socket 213 through a by-pass passage comprising the cavity 214, the valve chamber 223, the valve seat 222, the passage 226, the space 227 and the passage 238 to the socket 240, thus by-passing the valve 201. The piston 229 regulates the opening of the valve 220 whereby to limit the flow through the flow and deceleration responsive valve 201.

If the brake pedal should be depressed very suddenly, there is a sudden flow through the orifice 212 before the piston 229 has an opportunity to open the by-pass valve 203 in response or to further open the by-pass valve if it is already open. This causes a jet of brake fluid to impinge upon the ball 205 to cause the ball to roll up the rail 208 and close the valve seat 206. Any pressure difference between the spaces 230 and 227 acting on opposite faces of the piston 229 disappears so ensuring that the closure spring 224 can maintain the by-pass valve 203 closed or can close this by-pass valve if it was previously open. This disconnects the second chamber 237 from the first chamber 236. However the plunger 202 remains substantially pressure balanced because the pressure in the second chamber 237 is substantially the same as the pressure in the first chamber 236 immediately before closure of the valve 201, any pressure drop across the throttling groove 234 being small compared with the applied brake pressure. Further application of force to the brake pedal causes the plunger 202 to move towards the second chamber 237 against the spring 241, displacing from the chamber 237 to the rear brakes the same volume of fluid as enters the first chamber 236 from the master cylinder. However the further increase in pressure in the second chamber consequent upon such displacement of the plunger 202 is not as great as the further increase in pressure in the first chamber 236 causing such displacement because the pressure applied to the end face of the plunger exposed to the first chamber 236 has to counter-balance the force produced by the now compressed spring 241 as well as the pressure applied to the end face of the plunger 202 exposed to the second chamber 237. The line 28 shown in FIG. 2 is thereby obtained by the device shown in FIGS. 9 to 11. The device of FIGS. 9 to 11 operates in the manner just described also when the vehicle is caused to decelerate by an amount determined by the slope of the inclination provided by the rail 208 for when the device is subjected to this deceleration the ball 205 which has appreciable inertia can roll up the sloping rail 208 to close the valve seat 206.

As mentioned above, the device of FIGS. 9 to 11 is suitable for large vehicles. When the vehicle is unladen the normal weight on the rear wheels is much less than when the vehicle is fully loaded whereas the weight on the front wheels is substantially unaltered or is altered to a much lesser extent. It follows that the vehicle is much more prone to skidding of the rear wheels when the vehicle is unladen. When the vehicle is fully laden the device is inclined as illustrated to the horizontal indicated by the line 246. In this position, the slope of the rail 208 is about 35° to the horizontal. However the device is arranged to be adjusted manually or automatically when the vehicle is unladen, until the slope of the rail 208 is only about 5° to the horizontal indicated by the line 247. With a smaller slope the predetermined deceleration at which valve 201 closes is much smaller so that the risk of rear wheel skid when the vehicle is unladen is reduced. Intermediate positions of the device are possible when the vehicle is partly loaded.

The angular adjustment of the device may be manual or automatic. In the latter case the deflection of the rear wheel suspension springs may be used to adjust the device.

Figure 12:
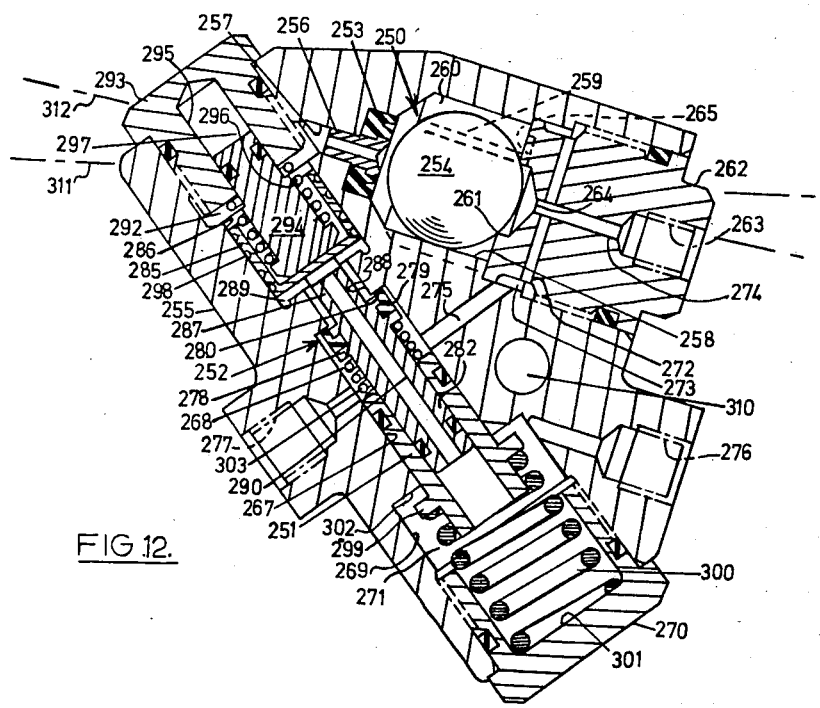
FIG. 12 is a longitudinal section of a seventh embodiment of brake pressure proportioning device constructed in accordance with the present invention.

FIG. 12 shows a preferred embodiment of brake pressure proportioning device for use in assisted hydraulic braking systems of heavy vehicles. The device of FIG. 12 comprises a flow and deceleration responsive valve 250, a tubular plunger 251 and a by-pass valve 252 which is shown in its closed position. The flow and deceleration responsive valve 250 comprises a valve seat 253 and a ball 254. The valve seat 253 is retained in the body 255 of the device by a tubular piece 256 which is a force fit in a bore 257. The ball 254 is arranged to roll in the valve chamber 260 on an incline provided by a sloping rail 258 vertically below the centre of the ball 254. Two guide rails 259 (one of which is indicated by dotted lines) are provided in the valve chamber 260 at opposite sides of the ball 254 for guiding the ball 254. The rails 258 and 259 are arranged at 120° to one another with respect to the bore. The normal resting position of the ball 254 in the chamber 260 of the valve 250 is determined by an annular abutment 261 at the inner end of a plug 262. A socket 263 is provided in the outer end of the plug 262 to receive the brake line 20 from the master cylinder and communicates by a passage 274 with an orifice 264 disposed to direct a jet of brake fluid onto the ball 254 to urge it towards the valve seat 253 upon a flow surge from the master cylinder. Notches 265 are provided in the annular abutment 261 to permit brake fluid flowing through the orifice 264 to flow into the valve chamber 260 around the ball 254. The orifice 264 could be replaced by a number of smaller orifices suitably positioned.

The tubular plunger 251 is slidable in a bore 267, whose axis is inclined to the axis of the valve 250 whereby the components of the device may be compactly arranged, and is sealed to the bore 267 by an O-ring. The inner end of the bore 267 defines a first chamber 268 and a counterbore 269, which is closed by a cup-shaped plug 270, defines a second chamber 271 beyond the outer end of the bore 267. Radial bores 272 connect an annular groove 273 in the plug 262 to the passage 274 leading from the socket 263. A transverse passage 275 in the body connects the first chamber 268 to the annular groove 273. A socket 276 for the rear brake line 22 communicates with the second chamber 271 and a socket 277 for the front brake line 16 communicates with the first chamber 268. The T-connection 15 of FIG. 1 is thus incorporated within the device of FIG. 12.

If the master cylinder is a tandem cylinder the front brake line 16 is connected to one chamber of the tandem master cylinder and the line 20 is connected between its other chamber and the socket 263. In this case the socket 277 is either closed or used for a pressure sensitive switch for the brake lights.

The by-pass valve 252 comprises a closure member 278 provided with a seal 279 adapted to close a valve seat 280 at the inner end of the bore 267. The first chamber 268 therefore also constitutes the chamber of the by-pass valve 252. The closure member 278 has an extension 282 which is slidably received within the tubular plunger 251 and sealed thereto by an O-ring. The diameter of the seal 279 is only slightly greater than the diameter of the extension 282 so that the closure member 278 is almost fully pressure balanced.

A piston 285 for controlling the by-pass valve 252 is slidable in a bore 286 axially aligned with the bore 267. The piston 285 engages a valve stem 287 forming a part of the closure member 278 which extends through the valve seat 280 and through a bore 288 which connects a space 289 formed at the inner end of the bore 286 to the valve seat 280. A longitudinal passage 290 extends right through the closure member 278 and its extension 282 to connect the space 289 to the second chamber 271. A space 292 at the opposite side of the piston 285 to the space 289 is closed by a plug 293 and the bore 257 breaks into the space 292 whereby this space is connected to the seat 253 of the flow and deceleration responsive valve 250. A bias plunger 294 is slidably received in a blind bore 295 in the inside of the plug 293 and is sealed to this bore by an O-ring. The plunger 294 is urged against the face of the piston 285 exposed to the space 292 by a bias spring 296. Air at approximately atmospheric pressure is trapped in the space 297 at the inner end of the blind bore 295. A helical groove 298 is provided in the periphery of the piston 285 and constitutes a throttle by which the space 292 is connected to the space 289.

It will be seen that the plunger 251 has opposite faces of equal effective area exposed to the first and second chambers 268 and 271 respectively. This effective area is the difference between the cross sectional areas of the bore 267 and the extension 282 of the closure member 278. Thus movement of the plunger 251 towards the second chamber 271 causes a decrease in the volume of this chamber equal to the consequent increase in the volume of the first chamber 268. Such movement is resisted by a compression spring 300 arranged in the second chamber 271 between a flange 299 on the plunger 251 and the inner face 301 of the plug 270. The free length of the spring 300 is less than the space available between the flange 299 and the inner face 301 of the plug 270 if the plunger 251 is moved from its illustrated normal resting position to a position in which the flange 299 contacts the bottom 302 of the counterbore 269. A closure spring 303 for the by-pass valve 252 acts between the closure member 278 and the plunger 251. This closure spring 303 is light compared with the spring 300 and serves to hold the plunger 251 without free play in its normal resting position illustrated in which the flange 272 abuts the spring 300 and the spring 300 abuts the face 301 of the plug 270 but the spring 300 is uncompressed. The closure spring 303 is also lighter than the bias spring 296 so that when the brakes are not applied and there is no flow of brake fluid through the device the by-pass valve 252 is not in its closed position illustrated but is opened by the bias spring 296 overcoming the closure spring 303.

As soon as slight pressure is applied to the brake pedal, fluid can flow to the rear brake socket 276 from the socket 263 both through the flow and deceleration responsive valve 250 and through a by-pass passage connecting the by-pass valve 252. This by-pass passage comprises the bores 272, the annular groove 273, the passage 275, the first chamber 268 acting also as a valve chamber, the valve seat 280 (the valve 252 being open) and the bore 288 leading to the space 289. The fluid flows from the space 289 through the passage 290 in the closure member 278 into the second chamber 271 and from there to the socket 276. Fluid flowing through the valve 250 flows from the valve chamber 260 through the valve seat 253, the tubular piece 256, the bore 257, the space 292 and the throttling groove 298 to the space 289 where it joins the fluid flowing through the by-pass passage. The bias spring 296 acting on the plunger 294 is not overcome, until a comparatively low brake pressure, such as 100 p.s.i., is reached, one end of this plunger being exposed to the space 292 to which the brake pressure is applied and the other end being exposed to the space 297 at substantially atmospheric pressure. The by-pass passage is therefore always open when there is a large flow of brake fluid to the rear brakes at low pressure such as occurs when the slackness in the brakes is being taken up. Telescoping of the plunger 294 into the bore 295 when this pressure is exceeded allows the closure spring 303 to close the by-pass valve 252. Brake fluid can now only flow to the rear brakes through the flow and deceleration responsive valve 250 and the throttling groove 298.

If the brakes are further applied, the by-pass valve 252 first closes upon telescoping of the plunger 294 when the comparatively low braking pressure is exceeded, as described above so that the full fluid flow to the rear brakes passes through the throttling groove 298. As there is now a greater flow through this groove a pressure difference is built up between the spaces 292 and 289 acting on the piston 285 which is sufficient to overcome the closure spring 303. The by-pass valve 252 is thereby opened again so that fluid flowing to the rear brakes can by-pass the valve 250. The consequent reduction in flow through the throttling groove 298 reduces the pressure difference acting on the piston 285 until the by-pass valve 252 remains open just sufficiently for the pressure difference across the piston 285 to balance the force of the closure spring 303. The by-pass valve 252 is thus controlled by the piston 285 in such a manner as to regulate the quantity of fluid which can normally flow through the flow and deceleration responsive valve 250 to the rear brakes.

Should the brake pedal be actuated very suddenly there is a flow surge through the orifice 64 which impinges upon the ball 254 which causes it to roll up the incline and close the valve seat 253. This surge through the orifice occurs because there is an inherent delay in response to the increased flow by the piston 285. When the valve seat 253 is closed the flow through the throttling groove 298 stops and the pressure difference between the spaces 292 and 289 acting on the piston 285 disappears whereupon the closure spring 303 can immediately close the by-pass valve 252. With the valves 250 and 252 both closed the first chamber 268 is no longer connected to the second chamber 271. Any further increase in the braking pressure applied to the socket 263 and thereby to the first chamber 268 results in the plunger 251 being displaced towards the second chamber 271, compressing the spring 300. However the further increase in the rear brake pressure prevailing in the second chamber 271 is not as great as the further increase in pressure in the first chamber 268 because the latter pressure has to also counterbalance the compression of the spring 300 which increases with increasing displacement of the plunger 251 from its illustrated normal resting position. The line 28 shown in FIG. 2 is thereby also obtained by the device shown in FIG. 12.

The device of FIG. 12 operates in the above described manner also when it is subjected to a deceleration sufficient to cause the ball 254 to roll up the incline and close the valve seat 253 even when there is no flow surge through the orifice 264.

Since it is desirable that the device of FIG. 12 should respond to a smaller deceleration when the vehicle is unladen than when it is loaded, the body 255 is provided with a bearing 310 by which the device can be pivotally mounted on a suitable shaft (not shown) on the vehicle to enable the slope of the incline provided by the rail 258 to be adjusted. Such adjustment may be manual or may be automatic, e.g. according to the deflection of the vehicle suspension springs. FIG. 12 shows the device in a suitable position for a fully laden vehicle in which the slope of the rail 258 with respect to the horizontal 311 is 15°. For an unladen vehicle a slope of 5° to the horizontal is desirable as indicated by the line 312.

The master cylinder of a power assisted braking system is actuated by the booster of the system and the line 14 from the master cylinder is connected to the socket 263. Because of the power assistance and the large size of the slave cylinders of such systems a considerable amount of brake fluid flows from the master cylinder to the slave cylinders as compared with non-power assisted systems. The provision of the by-pass passage including the by-pass valve 252 ensures that the flow and deceleration responsive valve 250 is not over-sensitive since only a proportion of the fluids to the rear brakes flows through the latter valve.

The compression springs 45, 81, 120, 148, 182, 241, 300 in the illustrated embodiments, are helical springs having a constant rate (i.e. their force is proportional to their compression) whereby line 28 of FIG. 2 is a straight line. However springs having variable rates may be used to obtain a curved line, if desired. The helical springs may be replaced by a stack of Belleville washers.

I claim:
1. A hydraulic brake pressure proportioning device comprising a body, first and second chambers in said body for connection respectively to a master cylinder and to at least one slave cylinder, a bore between said chambers, a plunger slidable in said bore and having opposite faces of substantially equal effective area exposed to said chambers so that displacement of the plunger from a normal resting position in one direction to increase the volume of the first chamber decreases the volume of the second chamber by an equal amount, a spring biassing said plunger in a direction opposite to said one direction, and a deceleration responsive valve normally interconnecting said first and second chambers, the deceleration responsive valve having a valve seat and an inertia member arranged to move to close said valve seat when the device is subjected to a predetermined deceleration.

2. A device according to claim 1 in which said valve seat is on said plunger and in which said plunger has a passage therein leading from said valve seat to said second chamber.

3. A device according to claim 2 in which said inertia body comprises a ball disposed in said first chamber and adapted to close said valve seat and in which the diameter of said plunger is at least half the diameter of said ball.

4. A device according to claim 1 which further comprises a bush fixed in said body in a predetermined position, said valve seat being on said bush, said second chamber being contained within said bush and said bush having a passage therein leading from said valve seat to said second chamber, said plunger being slidably guided in said bush.

5. A device according to claim 1 in which said spring has a free length such that this spring is unstressed when said plunger is undisplaced but said plunger has substantially no free play.

6. A device according to claim 1 which further comprises means for causing brake fluid to impinge said inertia member in a direction to cause said inertia member to move to close said valve seat in response to a flow surge through said deceleration responsive valve.

7. A device according to claim 6 which further comprises throttle means, means connecting said throttle means in series with said deceleration responsive valve so that closure of this valve interrupts flow through said throttle means, a by-pass passage by-passing said deceleration responsive valve and said throttle, a by-pass valve in said by-pass passage and control means for opening said by-pass valve responsively to a pressure drop across said throttle means.

8. A device according to claim 7 in which said control means comprises a piston slidable in a bore in said body, opposite ends of said throttle means being connected to opposite faces of said piston.

9. A device according to claim 8 in which said throttle means comprises groove means in the periphery of said piston.

10. A device according to claim 8 in which said body contains first and second spaces connected respectively to said valve seat of said deceleration responsive valve and to said second chamber, opposite faces of said piston being exposed to said spaces and said spaces being interconnected by said throttle means.

11. A device according to claim 10 in which said by-pass valve has a closure member and a closure spring biassing the last mentioned closure member in its closing direction, said piston engaging said closure member of said by-pass valve in a direction to open said by-pass valve when the force produced by a fluid pressure difference across said throttle and applied to said piston is sufficient to overcome said closure spring.

12. A device according to claim 10 which further comprises a biassing plunger, a bias spring urging said biassing plunger against said piston in the opening direction of said by-pass valve, said biassing plunger having a rear face exposed to a gas space and a front face exposed to said space connected to said valve seat of said deceleration responsive valve so that the pressure in the last-mentioned space opposes said bias spring, and in which said by-pass valve has a closure member and a closure spring biassing the last-mentioned closure member in its closing direction, said closure spring being weaker than said bias spring.

13. A device according to claim 7 in which said plunger is of tubular shape having a longitudinal bore therein and in which said by-pass valve has a closure member with an extension thereon, said extension being slidably received in said bore of said plunger and having an end face facing the opening direction of said by-pass valve, said end face being exposed to said second chamber.

14. A device according to claim 13 in which said closure member of said by-pass valve has a longitudinal bore forming part of said by-pass passage and leading through its extension to said end face thereof.

15. A device according to claim 13 which further comprises an abutment on said tubular plunger and a fixed abutment in said body, said spring against which said plunger is displaceable being arranged between said abutments and having a free length less than the maximum spacing available between said abutments, and in which said closure spring of said by-pass valve acts between said closure member thereof and said tubular plunger and is weaker than said spring against which said plunger is displaceable, whereby the position assumed by said tubular plunger when undisplaced is determined by the free length of the last-mentioned spring.

16. A device according to claim 1 in which said body has an incline therein sloping upwardly towards said valve seat of said deceleration responsive valve and in which said inertia member is a ball arranged to roll upwardly along said incline to close said valve seat.

17. A device according to claim 4 which further comprises a cage having an incline therein and means holding said cage in said body in abutment with said bush fixed in said body with said incline sloping upwardly towards said valve seat and in which said inertia member comprises a ball arranged in said cage to roll upwardly along said incline to close said valve seat.

18. A device according to claim 17 which further comprises orifice means formed in said cage in a position to cause brake fluid to impinge upon said ball to urge it in its closing direction upon a flow surge through said deceleration responsive valve.

19. A device according to claim 16 in which said incline comprises a sloping rail vertically below the centre of said ball and in which two inclined guide rails for the ball are provided in said body at opposite sides of said ball.

20. A device according to claim 21 in which said rails are at 120° to one another with respect to the ball.

21. A hydraulic brake pressure proportioning device comprising a body, first and second chambers in said body for connection respectively to a master cylinder and to at least one slave cylinder, a bore between said chambers, a plunger slidable in said bore and having opposite faces of substantially equal effective area exposed to said chambers so that displacement of the plunger from a normal resting position in one direction to increase the volume of the first chamber decreases the volume of the second chamber by an equal amount, an abutment on said plunger, a fixed abutment in said body, a compression spring arranged between said abutments to bias said plunger in a direction opposite to said one direction, a comparatively light auxiliary spring acting on said plunger in opposition to the first-mentioned spring whereby the position assumed by the plunger when undisplaced is determined by the free length of the first-mentioned spring, and a deceleration responsive valve normally interconnecting said first and second chambers, the deceleration responsive valve having a valve seat and an inertia member arranged to move to close the valve seat when the device is subjected to a predetermined deceleration.

22. A device according to claim 21 which further comprises means for causing brake fluid to impinge said inertia member in a direction to cause said inertia member to move to close said valve seat in response to a flow surge through said deceleration responsive valve.

23. A hydraulic brake pressure proportioning device comprising a body; a stepped bore in said body having a larger diameter portion and a smaller diameter portion; a plunger slidable in said larger diameter bore portion; a piston slidable in said smaller diameter bore portion, said plunger and piston being interconnected for joint sliding movement; a first chamber comprising two spaces at the ends of said bore portions remote from one another and means interconnecting said spaces; a second chamber at the juxtaposed ends of said bore portions, opposite faces of said plunger and piston being exposed to said chambers so that displacement of said plunger and piston from a normal resting position in a first direction towards said piston to increase the volume of said first chamber decreases the volume of said second chamber by an equal amount; a spring biassing said plunger in a direction opposite to said first direction; and a deceleration responsive valve normally interconnecting said first and second chambers, said deceleration responsive valve having a valve seat on said plunger, a passage in said plunger from said valve seat to said second chamber and an inertia member arranged to move to close said valve seat when the device is subjected to a predetermined deceleration.

24. A hydraulic brake pressure proportioning device comprising a body; first and second chambers in said body for connection respectively to a master cylinder and to at least one slave cylinder; a fluid displacing member positioned in said body to separate said chambers and having opposite faces exposed respectively to said first and second chambers; a series circuit comprising a flow responsive valve, throttle means and means connecting said throttle means to said flow responsive valve, said series circuit normally interconnecting said first and second chambers, said flow responsive valve having a valve seat and a flow sensitive member arranged to move to close the valve seat upon a flow surge through the flow responsive valve; a by-pass passage by-passing said series circuit; a by-pass valve in said by-pass passage; and a control member for opening said by-pass valve responsively to a pressure drop across said throttle means, said fluid displacing member being movable in said body under the influence of fluid pressure in said first chamber when said flow responsive and by-pass valves are both closed in a direction to decrease the volume of said second chamber to produce a pressure therein less than said pressure in said first chamber.

25. A device according to claim 24 in which said control member comprises a piston slidable in a bore in said body.

26. A device according to claim 25 in which said throttle means comprises groove means in the periphery of said piston.

27. A device according to claim 25 in which said body contains first and second spaces connected respectively to said valve seat of said flow responsive valve and to said second chamber, opposite faces of said piston being exposed to said spaces and said spaces being interconnected by said throttle means.

28. A device according to claim 27 in which said by-pass valve has a closure member and a closure spring biassing the last-mentioned closure member in its closing direction, said piston engaging said closure member of said by-pass valve in a direction to open said by-pass valve when the force produced by a fluid pressure difference across said piston is sufficient to overcome said closure spring.

29. A device according to claim 27 which further comprises a biassing plunger, a bias spring urging said biassing plunger against said piston in the opening direction of said by-pass valve, said biassing plunger having a rear face exposed to a gas space and a front face exposed to said space connected to said valve seat of said flow responsive valve so that fluid pressure in the last-mentioned space opposes said bias spring, and in which said by-pass valve has a closure member and a closure spring biassing the last-mentioned closure member in its closing direction, said closure spring being weaker than said bias spring.

30. A device according to claim 24 in which said flow responsive valve is also deceleration responsive and comprises a valve seat and an inertia ball adapted to close said valve seat and in which said body has an incline sloping upwardly towards said valve seat of said flow responsive valve, said ball being arranged to roll upwardly along said incline to close said valve seat responsively to a predetermined deceleration, said flow responsive valve being provided with orifice means disposed to cause brake fluid to impinge upon said ball to urge it in its closing direction upon a flow surge through said flow responsive valve.

31. A device according to claim 30 which further comprises means for adjusting the slope of said incline.

References Cited
UNITED STATES PATENTS

| | | | |
|---|---|---|---|
| 2,218,194 | 10/1940 | Freeman | 137—39 |
| 3,087,761 | 4/1963 | Stelzer | 137—38 X |
| 3,163,473 | 12/1964 | Stelzer. | |
| 3,168,351 | 2/1965 | Stelzer. | |
| 3,252,740 | 5/1966 | Stelzer. | |
| 3,317,251 | 5/1967 | Hambling | 303—24 |

CLARENCE R. GORDON, *Primary Examiner.*